United States Patent [19]
Johnson

[11] 3,952,766
[45] Apr. 27, 1976

[54] BACKFLOW PREVENTER
[75] Inventor: Dwight N. Johnson, Anaheim, Calif.
[73] Assignee: JH Industries, Inc., Santa Ana, Calif.
[22] Filed: Aug. 13, 1974
[21] Appl. No.: 497,111

[52] U.S. Cl............................. 137/218; 137/512.4; 137/516.11
[51] Int. Cl.²........................................ F16K 24/00
[58] Field of Search .......... 137/102, 107, 217, 218, 137/525, 525.1, 525.3, 512.4, 516.11

[56] References Cited
UNITED STATES PATENTS

| | | | |
|---|---|---|---|
| 2,621,889 | 12/1952 | Annin | 137/525 |
| 2,663,309 | 12/1953 | Filliung | 137/218 |
| 2,818,880 | 1/1958 | Ratelband | 137/525 |
| 2,941,541 | 6/1960 | Peras | 137/102 |
| 2,990,849 | 7/1961 | Peras | 137/525.1 X |
| 3,065,761 | 11/1962 | Peras | 137/102 |

FOREIGN PATENTS OR APPLICATIONS

| | | | |
|---|---|---|---|
| 875,034 | 8/1961 | United Kingdom | 137/107 |

*Primary Examiner*—Henry T. Klinksiek
*Attorney, Agent, or Firm*—Mason, Kolehmainen, Rathburn & Wyss

[57] ABSTRACT

A reduced pressure principle backflow preventer includes downstream and upstream check valves separating an inlet and an outlet from an intermediate zone. A differential pressure relief valve maintains the intermediate zone at a pressure lower than the inlet pressure during potential backflow conditions and vents the zone during potential back siphon conditions. A unitary body member supports a pair of resilient annular valve members and is inserted into a vented housing bore and retained by friction to form the complete backflow preventer. Both valve members are retained on shoulders on the body member and are held between the shoulders and the bore wall. One valve member includes an axially movable portion cooperating with a downstream valve seat on the body to form the downstream check valve. The second valve member is cylindrical in form and is radially movable inward against an upstream valve seat on the body to form the upstream check valve. Radially outward movement of the second valve member closes the vent ports so that this valve member performs the relief valve function as well. An annular spring surrounding the second valve member loads the member in opposition to the force applied by inlet pressure to establish the pressure differential operation of the relief valve, and to provide a pressure drop across the upstream check valve during forward flow. The unitary body includes a group of elongated slots in a cylindrical wall defining a strainer at the inlet of the backflow preventer.

20 Claims, 11 Drawing Figures

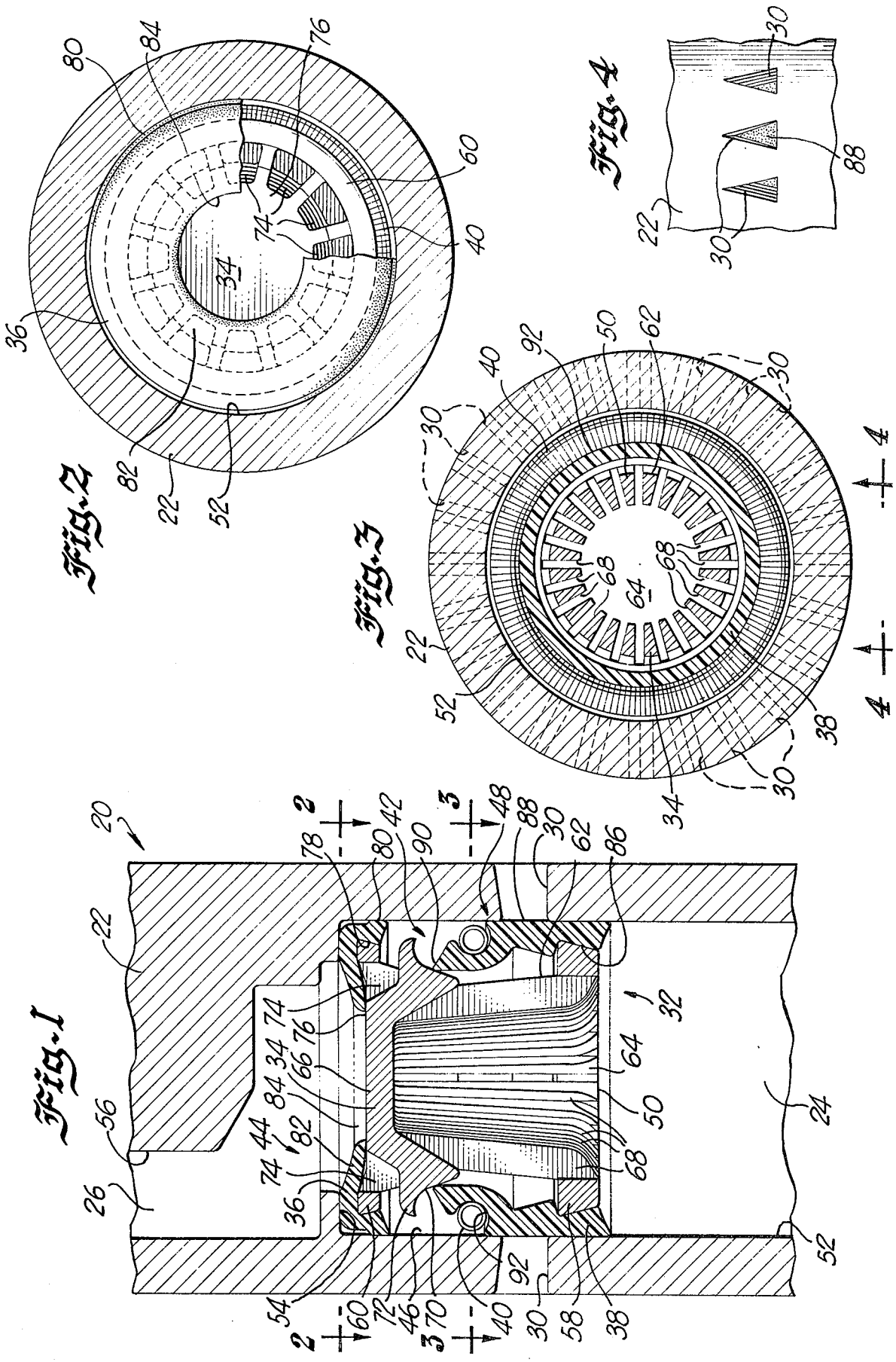

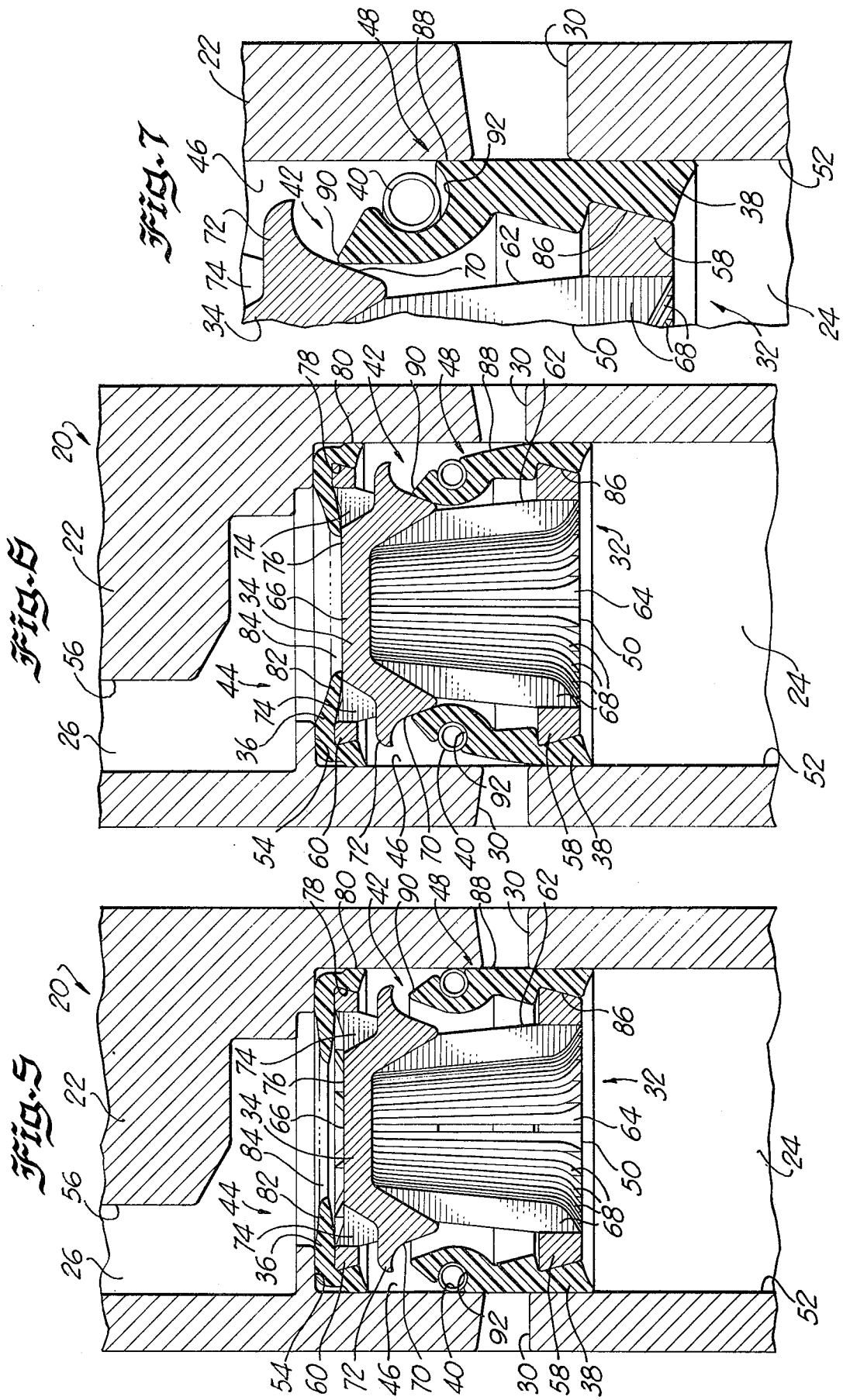

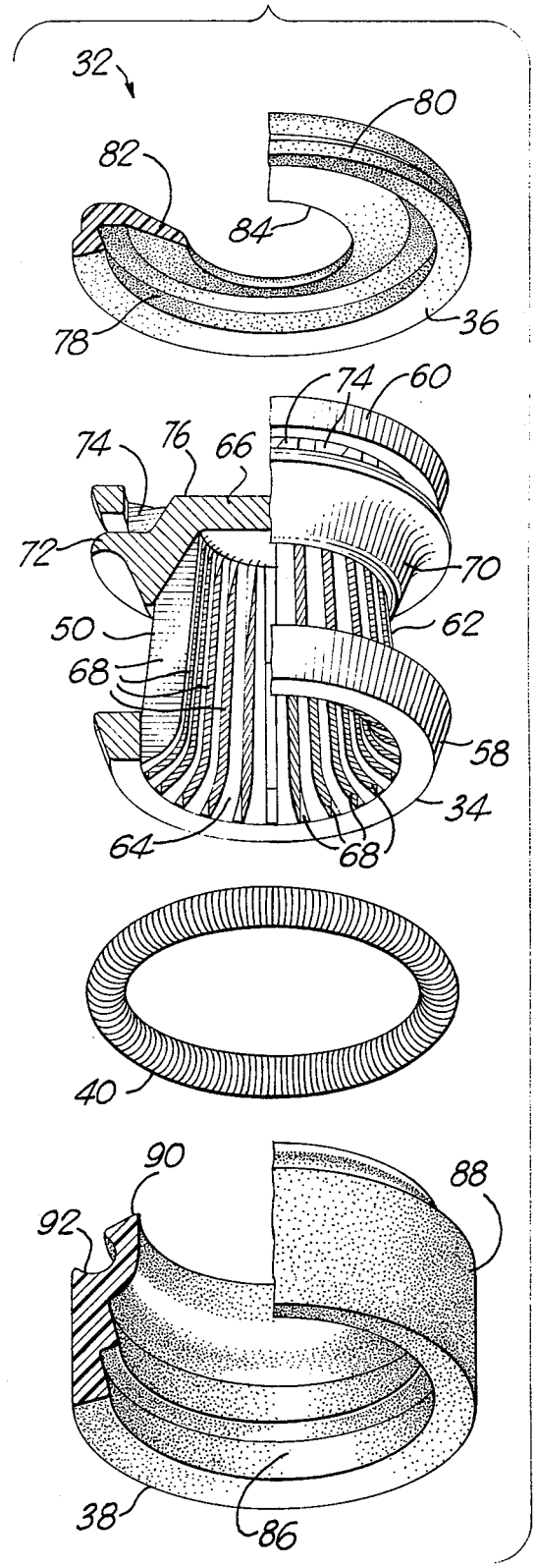
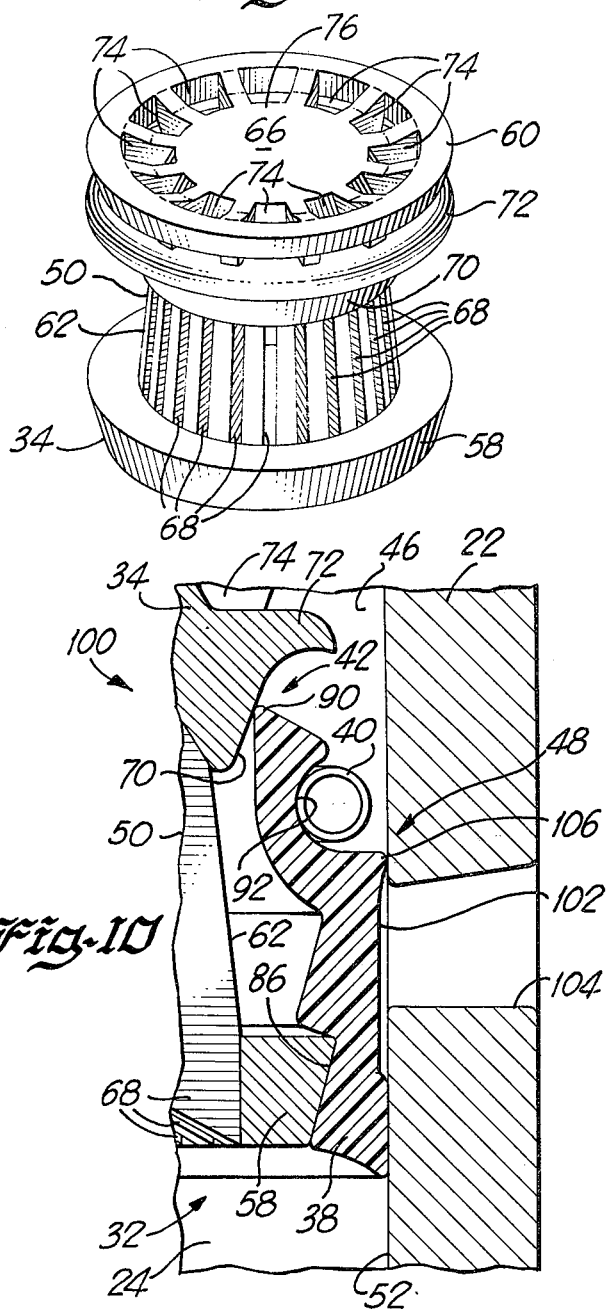
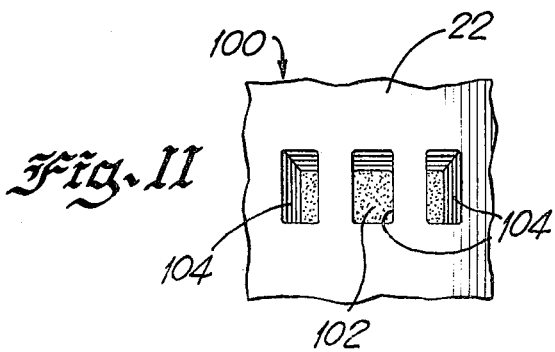

BACKFLOW PREVENTER

The present invention relates to backflow preventers, and more particularly to improvements in backflow preventers of the reduced pressure principle type wherein an intermediate zone between a pair of check valves is maintained below inlet pressure by a relief valve during poential backflow conditions.

Backflow preventers of many varieties have been developed for different purposes and types of service. In many instances, potable water supply lines are connected to deliver water for uses characterized by a possibility of contamination. Examples are tanks used in plating and photographic processes, livestock watering and fish hatchery tanks, toilet flush tanks and many others. In this type of service, use of a reduced pressure principle backflow preventer may be desirable reliably and positively to prevent reverse flow due to back pressure should the outlet pressure increase and to prevent back siphoning should the inlet pressure decrease.

A backflow preventer of the reverse pressure principle type includes an intermediate zone separated from the inlet and outlet of the backflow preventer by upstream and downstream check valves each permitting flow in only the forward direction. During potential backflow conditions, the intermediate zone is vented through vent passages by means of a differential pressure operated relief valve to maintain the zone at a pressure lower than the inlet pressure. The check valves prevent a reverse flow from occurring as a result of an abnormal back pressure condition. Should check valve leakage occur when the inlet pressure is relatively low, the relief valve opens to vent the intermediate zone and prevent back siphoning.

Reverse pressure principle backflow preventers developed in the past have employed conventional poppets, flapper members, orifices and the like to achieve the check valve and relief valve functions. Consequently, known devices have been quite complex, expensive, and difficult to assemble. In addition, the slide, hinge or similar mounting of valve parts has resulted in the problem of fouling and malfunction due to the presence of scale or deposits in the water.

Among the important objects of the present invention are to provide an improved reduced pressure principle backflow preventer; to provide a backflow preventer of extremely compact and simple construction; to provide a backflow preventer characterized by high reliability; to provide a backflow preventer wherein the difficulties experienced with metal parts and complex mechanical mounting arrangements are avoided; to provide a backflow preventer having few parts and wherein individual parts carry out more than one function; to provide a backflow preventer incorporating a novel strainer providing little resistance to flow; and to provide a reduced pressure principle backflow preventer overcoming the disadvantages experienced with devices of this type developed in the past.

In brief, in accordance with the above and other objects of the present invention, there is provided a reduced pressure principle backflow preventer including a simple cartridge assembly capable of being inserted into and frictionally held in place within a bore in a housing or conduit thereby to provide a complete backflow preventer. The cartridge includes a relatively rigid body member through which is defined a flow path. A pair of annular ribs on the body member support a pair of resilient valve members cooperating with valve seats defined on the body member to form downstream and upstream check valves. The portions of the valve members overlying the rims are constructed and arranged to have an interference fit with the bore wall for frictional retention of the cartridge within the bore, and a stop shoulder may be provided in the bore properly to align the cartridge with respect to vent passages communicating with the bore at an intermediate zone between the valve seats.

In accordance with a feature of the invention, one of the valve members is generally cylindrical in configuration and includes a radially movable portion movable inwardly against one valve seat to form an upstream check valve. Outward movement of this valve member closes the vent passages to carry out the differential pressure relief valve function. A spring member surrounds this valve member to provide a loading of the valve member to produce a pressure drop during forward flow conditions and to provide for the desired pressure differential for operation of the relief valve.

In accordance with another feature of the invention, the body member defines an axially extending inlet throat communicating with the upstream check valve member by means of a group of axially extending relatively narrow strainer slots providing an inlet strainer of relatively large area in a compact configuration.

The invention together with the above and other objects and advantages thereof may best be understood with reference to the following detailed description of the embodiments of the invention illustrated in the drawings, wherein:

FIG. 1 is an axial sectional view of a backflow preventer constructed in accordance with the present invention;

FIG. 2 is a sectional view, with portions broken away, taken along the line 2—2 of FIG. 1;

FIG. 3 is a sectional view taken along the line 3—3 of FIG. 1;

FIG. 4 is a fragmentary side view taken from the line 4—4 of FIG. 3;

FIG. 5 is a view similar to FIG. 1 illustrating the backflow preventer in the forward flow condition;

FIG. 6 is a view similar to FIG. 1 illustrating the backflow preventer subjected to a potential back siphon condition;

FIG. 7 is a fragmentary view on an enlarged scale of a portion of the backflow preventer of FIG. 1;

FIG. 8 is an exploded, partly broken away, perspective view of the components of the cartridge assembly of the backflow preventer of FIG. 1;

FIG. 9 is a top perspective view of the body member of the cartridge assembly;

FIG. 10 is a view similar to FIG. 7 illustrating an alternative embodiment of the backflow preventer of the present invention; and FIG. 11 is a view similar to FIG. 4 illustrating the backflow preventer of FIG. 10.

Having reference now to the drawings, and initially to FIGS. 1–9, there is illustrated a backflow preventer designated as a whole by the reference numeral 20 and constructed in accordance with the principles of the present invention. The backflow preventer 20 includes a housing 22 having an inlet 24, an outlet 26 and a number of vent passages 30. In a normal installation, the inlet 24 is in communication with a source of pressurized liquid, typically a normal potable water supply system at a pressure, for example, of perhaps 60 psi.

The outlet 26 is communicated with a water utilization device of any desired type, such as a tank, container or the like. Normally a control valve is interposed between the outlet 26 and the water utilization device in order to control the flow of water from the supply to the device. The vent passages 30, as illustrated, communicate with atmosphere.

In use, the backflow preventer 20 permits water to flow in the forward direction through the housing 22 from the inlet 24 to the outlet 26. Flow in the reverse direction from the outlet 26 to the inlet 24 is prevented in order to avoid the possibility of contamination of the water supply from contaminants, pollutants or toxic substances that may be present in the water utilization device.

In accordance with an important feature of the present invention, the backflow preventer 20 is of extremely simple construction and includes a cartridge assembly generally designated as 32 which, as in the illustrated embodiment, is capable of simply being inserted into the housing 22 and of thereafter being retained in place by friction alone in order to form the complete backflow preventer. This novel assembly arrangement makes it possible easily to incorporate the backflow preventer 20 in a conduit, housing, or other member having a flow path therethrough. In the illustrated arrangement, the backflow preventer 20 is incorporated in the inlet portion of a water level control valve, or tank fill valve, of the type disclosed in copending application Ser. No. 339,548 filed on Mar. 9, 1973, now U.S. Pat. No. 3,895,645.

The simplicity, reliability and small expense of the backflow preventer 20 are enhanced by the fact that the cartridge assembly 30 is made up of a small number of simple and easily fabricated parts. Thus, the assembly 32 consists of a relatively rigid, unitary body member 34, a downstream flexible resilient valve member 36, an upstream flexible resilient valve member 38, and a loading spring 40. After assembly, these elements cooperate with one another and with the housing 22 to perform the various functions of an upstream and a downstream check valve, a differential pressure operated relief valve, and an inlet strainer.

The backflow preventer 20 is a reduced pressure principle type, and includes an upstream check valve designated gernally as 42 and a downstream check valve designated generally as 44 disposed on opposite sides of an intermediate zone 46 located between the inlet 24 and the outlet 26. Moreover, the backflow preventer 20 includes a differential pressure operated relief valve designated as 48 capable of interconnecting the intermediate zone 46 with the vent passages 30. In accordance with a feature of the invention, the valve member 38 functions as a part of both the check valve 42 and the relief valve 48. Also in accordance with the invention, the single unitary body member 34 not only supports the valve members 36 and 38 and forms seat portions cooperating with the valve members, but also provides a large area strainer 50 in a very compact manner at the inlet of the backflow preventer 20.

Proceeding now to a more detailed description of the structure of the various components of the backflow preventer 20, the housing 22 as indicated above may comprise any one of a wide variety of elements provided with a flow path therethrough. In the illustrated arrangement, the housing is a generally cylindrical segment of fluid conduit having a cylindrical bore 52 extending from the inlet end 24 to a stop shoulder 54 disposed between the inlet 24 and the outlet 26. An outlet passage 56 extends from the region of the stop shoulder 54 to the outlet 26. The vent passages 30 are preferably of a tapered or triangular configuration reducing in area in the downstream direction, and are located in a circular array around the periphery of the housing 22. In assembly of the backflow preventer 20, the stop shoulder 54 serves to limit the insertion of the cartridge assembly 32, and to properly orient the cartridge assembly 32 relative to the vent passages 30.

Body member 34 is best illustrated with reference to FIGS. 8 and 9, and comprises a relatively rigid, unitary body of material preferably non-metallic in nature. For example, the body 34 may be formed as a molded plastic member, acetal plastic being one preferred material.

In general configuration, the body member 34 is somewhat spool-shaped in form, and includes a pair of annular rims or projections 58 and 60 joined by a generally cylindrical, axially extending portion 62 smaller in diameter than the rims 58 and 60. When inserted into the bore 52, the rim 58 is directed toward the inlet, and the body 34 is provided with an axially extending inlet throat 64 terminating at the upstream end of the body 34 at a closed wall 66.

In order to provide for straining of fluid entering the backflow preventer 20 from the inlet 24, the throat 64 is surrounded by the strainer 50. The strainer is formed by an array of strainer slots 68 permitting radial flow through the cylindrical portion 62. Each slot 68 is of substantial axial length, and the total flow area is large enough so that little restriction is imposed on flow through the strainer. Preferably, each slot 68 is narrower in width than the openings provided through the check valves 42 and 44 in order effectively to prevent interference with operation of the valve by particles in the fluid. In the illustrated arrangement, each check valve is able to pass a particle roughly twice the size of the strainer slot width.

Fluid entering the inlet throat 64 during forward flow conditions moves radially outward through the strainer 50 to the vicinity of a first generally annular valve seat 70 defined on the body 34 separating the intermediate zone 46 from the inlet 24. The seat 70 is generally radially outwardly directed and is spaced from the bore wall 52. A roof or umbrella projection 72 having a diameter greater than that of the valve seat 70 is provided to prevent a possibility of fluid leaking in the reverse direction toward the inlet 24.

A series of discharge passages 74 are provided in a circular, generally axially directed array around the periphery of the closed wall 66 and radially inside of the rim 60. The intermediate zone 46 and the discharge passages 74 communicating therewith are separated from the outlet passage 56 of the housing 22 by a second valve seat 76 formed on the body 34 and more specifically on the downstream side of the closed wall 66. The valve seat 76 is generally axially directed in the downstream direction, and is located radially inside of the circular array of discharge passages 74.

In accordance with the present invention, each of the valve members 36 and 38 comprises a unitary flexible body of rubber or the like carried by one of the rims 58 and 60 and being dimensioned to form an interference fit between the cartridge assembly 32 and the bore 52. With reference first to the downstream valve member 36, this member is of a somewhat washer-like configuration and includes an outer annular flange portion defining a circular retention groove 78 fitting over the rim 60. When mounted on the rim 60, the valve member 38 is held firmly in place upon the body member 34. A radially outwardly extending protuberance portion 80 slides along the bore 52 during assembly, and frictionally locks the cartridge in place with the periphery of the valve member 36 locked or clamped in place between the rim 60, the bore wall 52, and the stop shoulder 54.

Valve member 36 cooperates with valve seat 76 to form the downstream check valve 44. The central portion of the valve member 36 is unsupported and is free to move between a first position in engagement with the valve seat 76 (FIGS. 1 and 6) and a second, open position (FIG. 5) displaced downstream from the valve seat 76. The valve member 36 is provided with a central opening 84 permitting flow from the downstream check valve 44 to the outlet 26.

With reference now to the upstream valve member 38, this element is of a generally cylindrical shape, and at its upstream end includes an interior retention groove 86 adapted to fit over the rim 58 in order to mount the valve member 38 firmly in place on the body 34. An interference fit may be provided between the valve member 38 and the wall of the bore 52 for retaining the cartridge assembly 32 in place upon assembly. After assembly, the downstream end of the valve member 38 is locked or clamped in place between the rim 58 and the wall of the bore 52.

The upstream portion of valve member 38 is telescoped between the cylindrical portion 62 of the body member 34 and the wall of the bore 52, and is capable of radial movement in inward and outward directions. The valve member 38 includes an outer surface 88 intermediate its ends adapted to overlie and close the vent passages 30 when the valve member 38 is in its radially outward position (FIGS. 1 and 5). At its downstream end, the valve member 38 includes a terminal lip portion 90 engageable with the valve seat 70 and thus forming a part of the upstream check valve 42.

Loading spring 40 exerts a radially inward loading force upon the radially movable portions of the valve member 38. In the illustrated arrangement, the loading spring 40 comprises an annular coil spring known as a garter spring, and is formed of a metal such as stainless steel. Spring 40 is supported in tension in a spring receiving annular groove 92 formed on the outer periphery of the valve member 38 between the lip portion 90 and the surface 88. Other types of spring arrangements may be used if desired, and in some applications, the resiliency of the valve member 38 itself may be used to provide the loading force.

The operation of the backflow preventer 20 can best be understood with reference to FIGS. 1, 5 and 6. In FIG. 5, the device is illustrated in the forward flow condition wherein the inlet 24 is pressurized and fluid is flowing from the inlet 24 through the backflow preventer 20 and is discharged from the outlet 26. The upstream check valve 42 is opened by the force resulting from inlet pressure and flow through the valve 42 experiences a pressure drop of, for example, 3 or 4 psi due to the loading force provided by the spring 40. The vent passages 30 are closed by the surface 88. Fluid flows from the valve 42 through the intermediate zone 46 and the discharge passages 74 to the downstream check valve 44. Valve member 36 is displaced in the downstream direction, and fluid flowing through the valve 44 experiences an additional pressure drop of, for example, 1 psi.

In FIG. 1, the device is illustrated in the no flow condition with the inlet pressurized and with the outlet 26 blocked, as by closing of a control valve connected to the outlet 26. When flow is discontinued, the upstream check valve 42 closes due to the force applied by the loading spring 40. It should be noted that loading spring 40 also acts to urge the surface 88 away from the vent passages 30 and thus tends to open the relief valve 48. This tendency is opposed by the pressure differential between the inlet 24 and the zone 46. If the pressure within the zone 46 begins to rise to a level approximating that of the inlet pressure, the surface 88 contracts and fluid is vented or leaked from the zone 46 to maintain the pressure in this zone at a predetermined value, as perhaps a few psi, below inlet pressure. In a potential backflow situation caused by an increase in outlet pressure, the downstream check valve 44 is pressure biased in its closed position and prevents the flow of fluid in the reverse direction from the outlet 26 to the intermediate zone 46.

In FIG. 6 the backflow preventer 20 is illustrated in a potential back siphonage condition wherein, for example, the pressure at inlet 24 is low or negative. Valve member 38 is radially comprssed tightly to close the upstream check valve 42, and to open the relief valve 48 — i.e., to move sealing surface 88 away from the vent passages 30. Consequently, the intermediate zone 46 is vented to atmosphere through the vent passages 30. The downstream check member 44 is tightly seated preventing any flow in the reverse direction toward inlet 24.

When the potential backflow or back siphonage condition is discontinued, valve member 38 returns to its normal no flow position illustrated in FIG. 1. The surface 88 closes the vent ports 30 while the upstream check valve 42 remains closed. After closing of the relief valve 48, intermediate zone 46 is recharged to a pressure below inlet pressure by some flow through the upstream check valve 42. When the desired pressure differential is reached, the upstream check valve closes due to the force provided by the loading spring 40.

In the event of leakage through the downstream check valve 44 in a potential backflow condition, the relief valve 48 opens to vent the intermediate zone 46 and to maintain the pressure in zone 46 below the inlet pressure thereby positively preventing reverse flow to the inlet 24. More specifically, in the event of leakage through valve 44, if the pressure within zone 46 rises, the spring 40 controls flow through the vent passages 30 so that, in a steady state condition, the reverse flow through the downstream check valve 42 is equal to the leakage flow through the relief valve 48.

In the event of leakage through the upstream check valve 42, the relief valve 48 will also be opened due to the absence of sufficient pressure differential between the inlet 24 and the zone 46. Consequently, assuming that the inlet 24 is at a pressure above atmospheric pressure, any flow which takes place will be from the inlet 24 through the vent passages 30. If, in this condition, the inlet 24 is at a negative pressure, the downstream check valve 42 prevents reverse flow from the outlet 26 to the inlet 24. Even should the downstream check valve 42 also leak at this time, an air gap will be present in the zone 46 and the umbrella or roof projection 72 directs any leakage in the reverse direction from valve 44 toward the vent passages 30 and away from the upstream check valve 44. Thus, in this condition, fluid from the outlet 26 flows out from the vent passages 30, while air is drawn through the vent passages 30 and through the upstream check valve 42.

Having reference now to FIGS. 10 and 11, there are illustrated portions of a backflow preventer designated as a whole by the reference numeral 100 and comprising an alternative embodiment of the present invention. For the most part, the backflow preventer 100 is identical with the backflow preventer 20, and similar reference numerals are used for similar portions of the structure of the two devices.

In the backflow preventer 100, the relief valve 48 does not always open when the pressure in the intermediate zone 46 rises to a level nearly equal to the pressure in the inlet 24. Rather, the existence of substantial pressure in the intermediate zone 46 firmly clamps the relief valve 48 in a closed position to prevent any leakage through the vent passages 30. This construction has particular utility where the potential for high outlet pressures does not exist. More specifically, when the backflow preventer 100 is used in the inlet to a tank capable of achieving a pressure head of only a few feet of water, the potential for backflow does not exist except in a back siphonage situation when the inlet pressure may drop to a negligible or negative level.

With reference to FIG. 10, it can be seen that the outer periphery of the upstream valve member 38 is provided with a continuous groove 102 registering with a group of vent passages 104. At the downstream edge of the groove 102, there is provided a lip adapted sealingly to engage the surface of bore 52. Unlike the vent passages 30 of the backflow preventer 20, the passages 104 are rectangular in configuration. The result of this modification in structure is that one side of the lip 106 is continuously in communication with atmospheric pressure, while the opposite side is continuously in communication with the intermediate zone 46. Consequently, relief valve 48 does not act under all conditions as a differential pressure responsive relief valve. Rather, there is a tendency for the valve to remain closed when the pressure within intermediate zone 46 is substantially above atmospheric pressure due to pressure biasing of the lip 106 into sealing engagement with the wall of bore 52. Should the inlet pressure drop to zero or a negative value in a potential back siphonage situation, the valve member 38 radially contracts due to loading of the spring 40 to open the relief valve 48 in the manner discussed above in connection with the backflow preventer 20.

Because the check and relief valve functions in the backflow preventers 20 and 100 are performed by simple, non-metallic parts, the problems of corrosion and binding due to foreign matter in the fluid are avoided. The check valves 42 and 44 close with a wiping action further reducing a tendency to become fouled.

While the present invention has been described with reference to details of the illustrated embodiment, these details are not intended to limit the invention as defined in the following claims.

What is claimed and desired to be secured by Letters Patent of the United States is:

1. A backflow preventer comprising a housing having a bore therein including inlet and outlet portions separated by an intermediate zone, vent passage means extending from said intermediate zone, a unitary and relatively rigid body member in said bore overlying said vent passage means, spaced first and second valve seats defined on said body member adjacent said inlet and outlet portions respectively, a first resilient valve member having a first portion held between said body member and the wall of said bore and having a movable second portion engageable with said first valve seat to define a first check valve for flow from said inlet portion to said intermediate zone, a second resilient valve member having a first portion held between said body member and the wall of said bore and having a movable second portion engageable with said second valve seat to define a second check valve for flow from said intermediate zone to said outlet portion, said first valve member including a third movable portion engageable with the wall of said bore adjacent said vent passage means.

2. The backflow preventer of claim 1 further comprising spring means engageable with said first valve means and urging said second portion of said first valve member toward said first valve seat and urging said third portion away from the wall of said bore.

3. The backflow preventer of claim 1, said body member including a plurality of strainer slots intercommunicating said inlet portion and said first valve seat.

4. In a backflow preventer, the combination of a housing having a bore defining a flow path, a fixed structure disposed in said bore and defining an annular, radially outward directed valve seat surface facing and spaced from the wall of said bore and a second valve seat downstream of said first valve seat, wall means preventing flow through said fixed structure radially inside of said valve seat, an annular retention surface on said fixed structure spaced in the upstream direction from said valve seat, and a flexible resilient valve member of a generally cylindrical shape telescoped between said fixed structure and the wall of said bore, said valve member including an upstream end portion clamped in a fixed position between said retention surface and the wall of said bore, a downstream end portion radially movable into and out of engagement with said valve seat and, a second flexible resilient valve member engageable with said second valve seat.

5. The combination of claim 4, further comprising a generaly cylindrical wall of said fixed structure extending between said retention surface and said valve seat, and radial flow passage means in said wall for flow toward said valve seat.

6. The combination of claim 5, said radial flow passage means comprising a plurality of elongated strainer slots.

7. The combination of claim 4 further comprising loading means engageable with said valve member for urging said member toward said valve seat and away from said vent ports.

8. The combination of claim 7, said loading means comprising an annular spring surrounding said valve member between said downstream end portion and said radially outwardly facing surface.

9. A backflow preventer comprising in combination housing means having a bore therethrough defining a flow path including an inlet portion and an outlet portion, vent port means in said housing communicating with said bore between said inlet and outlet portions, and a cartridge assembly slidably inserted into said bore and frictionally retained between said inlet and outlet portions by frictional engagement with said bore, said cartridge assembly including first and second check valves adjacent said inlet portion and said outlet portion respectively for permitting flow from said inlet portion to said outlet portion in response to a predetermined pressure differential therebetween, an intermediate zone defined in said bore between said first and second check valves, and a differential pressure relief valve for intercommunicating said vent port means and said intermediate zone in response to a predetermined pressure differential between said inlet portion and said intermediate zone.

10. The backflow preventer of claim 9, said housing including abutment means in said bore for locating said cartridge assembly.

11. The backflow preventer of claim 10, said abutment means comprising a shoulder in said bore adjacent said outlet portion.

12. A cartridge assembly adapted to be inserted into and frictionally retained in a bore in order to form a backflow preventer, said cartridge assembly comprising:
- a rigid, one-piece body member of generally spool-shape including a spaced pair of annular rims and a generally cylindrical portion extending axially between said rims;
- passage means defining a flow path extending through said body;
- first and second valve seats defined by said body in spaced positions along said flow path; and
- first and second resilient valve members each including a first portion encircling one said rim and a second portion engageable with one said valve seat.

13. The assembly of claim 12, said first portion of at least one said valve member having an interference fit with the bore.

14. A backflow preventer comprising a housing having a bore therein including inlet and outlet portions separated by an intermediate zone, a unitary and relatively rigid body member in said intermediate zone, spaced first and second valve seats defined on said body member adjacent said inlet and outlet portions respectively, a first resilient valve member having a first portion held between said body member and the wall of said bore and having a movable second portion engageable with said first valve seat to define a first check valve for flow from said inlet portion to said intermediate zone, a second resilient valve member having a first portion held between said body member and the wall of said bore and having a movable second portion engageable with said second valve seat to define a second check valve for flow from said intermediate zone to said outlet portion.

15. The backflow preventer of claim 14, said body member including a plurality of strainer slots intercommunicating said inlet portion and said first valve seat.

16. A backflow preventer comprising in combination housing means having a bore therethrough defining a flow path including an inlet portion and an outlet portion, and a cartridge assembly slidably inserted into said bore and frictionally retained between said inlet and outlet portions by frictional engagement with said bore, said cartridge assembly including first and second check valves adjacent said inlet portion and said outlet portion respectively for permitting flow from said inlet portion to said outlet portion in response to a predetermined pressure differential therebetween, an intermediate zone defined in said bore between said first and second check valves.

17. The backflow preventer of claim 16, said housing including abutment means in said bore for locating said cartridge assembly.

18. The backflow preventer of claim 16, said abutment means comprising a shoulder in said bore adjacent said outlet portion.

19. A backflow preventer comprsing a housing having a bore therein including an inlet and an outlet separated by an intermediate zone, a unitary and relatively rigid body member in said intermediate zone, spaced first and second valve seats defined on said body member adjacent said inlet and outlet respectively, valve means comprising a first resilient portion having a first part held between said body member and the wall of said bore and having a movable second part engageable with said first valve seat to define a first check valve for flow from said inlet portion to said intermediate zone, a second resilient portion having a first part held between said body member and the wall of said bore and having a movable second part engageable with said second valve seat to define a second check valve for flow from said intermediate zone to said outlet.

20. The backflow preventer of claim 19, said portions being separate.

* * * * *